(12) United States Patent
Aviles, Jr. et al.

(10) Patent No.: US 11,416,148 B2
(45) Date of Patent: Aug. 16, 2022

(54) SYSTEM AND METHOD OF PROVIDING ATOMICITY TO LARGE WRITES TO PERSISTENT MEMORY

(71) Applicant: Samsung Electronics Co., Ltd., Suwon-si (KR)

(72) Inventors: Angel Benedicto Aviles, Jr., San Jose, CA (US); Vinod Kumar Daga, Santa Clara, CA (US); Vamsikrishna Sadhu, Santa Clara, CA (US); Tejas Hunsur Krishna, Sunnyvale, CA (US)

(73) Assignee: SAMSUNG ELECTRONICS CO., LTD.

( * ) Notice: Subject to any disclaimer, the term of this patent is extended or adjusted under 35 U.S.C. 154(b) by 78 days.

(21) Appl. No.: 16/795,562

(22) Filed: Feb. 19, 2020

(65) Prior Publication Data

US 2021/0216219 A1 Jul. 15, 2021

Related U.S. Application Data

(60) Provisional application No. 62/959,869, filed on Jan. 10, 2020.

(51) Int. Cl.
*G06F 3/06* (2006.01)
(52) U.S. Cl.
CPC .......... *G06F 3/0619* (2013.01); *G06F 3/0631* (2013.01); *G06F 3/0685* (2013.01)
(58) Field of Classification Search
CPC ..... G06F 3/0619; G06F 3/0631; G06F 3/0685
See application file for complete search history.

(56) References Cited

U.S. PATENT DOCUMENTS

| 8,195,891 | B2 | 6/2012 | Trika | |
|---|---|---|---|---|
| 9,020,987 | B1 | 4/2015 | Nanda et al. | |
| 9,213,609 | B2 | 12/2015 | Hansen et al. | |
| 9,218,278 | B2 | 12/2015 | Talagala et al. | |
| 10,430,111 | B2* | 10/2019 | Stevens | G06K 9/00 |
| 2012/0059803 | A1* | 3/2012 | Nagpal | G06F 3/0652 |
| | | | | 707/691 |
| 2014/0006685 | A1* | 1/2014 | Peterson | G06F 3/0688 |
| | | | | 711/102 |
| 2016/0139842 | A1* | 5/2016 | Nakata | G06F 3/0689 |
| | | | | 711/162 |
| 2019/0205214 | A1* | 7/2019 | Morning-Smith | G06F 1/30 |
| 2019/0332503 | A1* | 10/2019 | Yang | G06F 11/2082 |

* cited by examiner

*Primary Examiner* — Michelle T Bechtold
(74) *Attorney, Agent, or Firm* — Renaissance IP Law Group LLP

(57) ABSTRACT

A system and a method are disclosed that provides atomicity for large data writes to persistent memory of an object storage system. A segment of persistent memory is allocated to an application. The persistent memory includes non-volatile memory that is accessible in a random access, byte-addressable manner. The segment of persistent memory is associated with first and second bits of a bitmap. The first bit is set indicating that the segment of persistent memory has been allocated. Data is received from the application for storage in the segment of persistent memory, and the second bit is set indicating that data in the segment of persistent memory has been finalized and is ready for storage in a storage medium that is different from persistent memory. The atomicity of the data in persistent memory may be determined based on the first bit and the second bit being set.

20 Claims, 2 Drawing Sheets

SYSTEM AND METHOD OF PROVIDING ATOMICITY TO LARGE WRITES TO PERSISTENT MEMORY

CROSS-REFERENCE TO RELATED APPLICATION

This application claims the priority benefit under 35 U.S.C. § 119(e) of U.S. Provisional Application No. 62/959,869, filed on Jan. 10, 2020, the disclosure of which is incorporated herein by reference in its entirety.

TECHNICAL FIELD

The subject matter disclosed herein relates to object storage systems. More specifically, the subject matter disclosed herein relates to a system and a method that provides atomicity for large data writes to persistent memory.

BACKGROUND

A single write to a persistent memory (e.g., nonvolatile dual inline memory (NVDIMM), storage class memory (SCM)) is consistent only within a specific size (e.g., a cache line) that is based on an underlying central processing unit (CPU), an operating system (OS), or both. When a large amount of data (greater than, for example, a cache line) is written to persistent memory, there is no guarantee that the entire data is consistent if a power-failure occurs during the write. Moreover, there is no standard technique for guaranteeing atomicity of large data writes to persistent memory and, therefore, there is no way to know which data are recoverable after a power failure.

SUMMARY

An example embodiment provides an object storage system that may include a storage medium, persistent memory and a controller. The persistent memory may include nonvolatile memory that is accessible in a random access, byte-addressable manner. The controller may be coupled to the storage medium and the persistent memory, and the controller may be configured to: receive data from an application for storage in a segment of the persistent memory that has been allocated to the application in which the segment of the persistent memory may be associated with a first bit and a second bit of a bitmap, and the first bit may be set to indicate that the segment of the persistent memory has been allocated to the application; set the second bit of the bitmap to indicate that data in the segment of the persistent memory has been finalized and is ready for storage in a storage medium that is different from the persistent memory; and determine whether the data in the persistent memory has atomicity based on the first bit and the second bit being set. In one embodiment, the controller may be further configured to allocate the segment of the persistent memory to the application in response to a request received from the application. In still another embodiment, the controller is further configured to store the data in the segment of the persistent memory in the storage medium based on the second bit of the bitmap being set. The persistent memory may further include a plurality of segments each having a same size as another segment of the plurality of segments, and each segment may be associated with a corresponding first bit and a corresponding second bit of the bitmap. In one embodiment, the bitmap may include a first bitmap region and a second bitmap region, and the first bit associated with each of the plurality of segments may be located in the first bitmap region and the second bit associated with each of the plurality of segments may be located in the second bitmap region.

An example embodiment provides an object storage system that may include a storage medium, persistent memory and a controller. The persistent memory may include non-volatile memory that is accessible in a random access, byte-addressable manner. The controller may be coupled to the storage medium and the persistent memory, and may be configured to: allocate a segment of the persistent memory to an application in which the segment of the persistent memory may be associated with a first bit and a second bit of a bitmap; set the first bit of the bitmap to indicate that the segment of the persistent memory has been allocated; receive data from the application for storage in the segment of the persistent memory; set the second bit of the bitmap to indicate that data in the segment of the persistent memory has been finalized and is ready for storage in a storage medium that is different from the persistent memory; and determine whether the data in the persistent memory has atomicity based on the first bit and the second bit being set.

An example embodiment provides a method to provide atomicity for data writes to an object storage system that may include: allocating a segment of a persistent memory to an application in which the persistent memory may include non-volatile memory that is accessible in a random access, byte-addressable manner, and the segment of the persistent memory may be associated with a first bit and a second bit of a bitmap; setting the first bit of the bitmap to indicate that the segment of the persistent memory has been allocated; receiving data from the application for storage in the segment of the persistent memory; setting the second bit of the bitmap to indicate that data in the segment of the persistent memory has been finalized and is ready for storage in a storage medium that is different from the persistent memory; and determining whether the data in the persistent memory has atomicity based on the first bit and the second bit being set.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
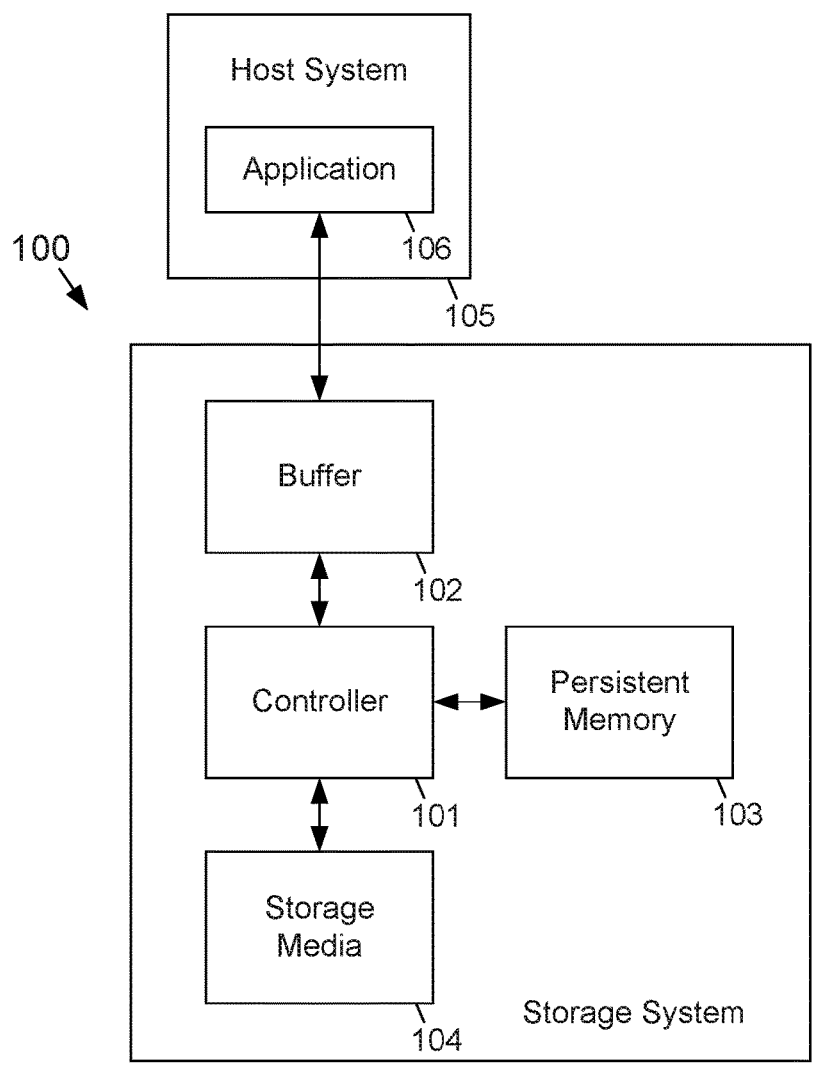
FIG. 1 depicts a block diagram of an object storage system that provides an atomicity for large writes to the object storage system according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

The subject matter disclosed herein provides a system and a method that ensures atomicity, or complete updates (no partial updates), for large data writes to persistent memory. A segment of a persistent memory may be allocated to an application. The persistent memory may include non-volatile memory that is accessible in a random access, byte-addressable manner. The segment of the persistent memory may be associated with first and second bits of a bitmap. The first bit may be set indicating that the segment of the persistent memory has been allocated to an application. Data is then received from the application for storage in the segment of the persistent memory, and the second bit may be set indicating that data in the segment of the persistent memory has been finalized and is ready for storage in a storage medium that is different from the persistent memory. The atomicity of the data in the persistent memory may be determined based on the first bit and the second bit being set.

FIG. 1 depicts a block diagram of an object storage system 100 that provides an atomicity for large writes to the object storage system according to the subject matter disclosed herein. The object storage system 100 may include a controller 101, a data buffer 102, a persistent memory 103, and a storage media 104. The controller 101 is communicatively coupled to each of the data buffer 102, the persistent storage 103, and the storage media 104. The various components depicted in FIG. 1 for the object storage system 100 may be implemented as one or more modules.

The controller 101 may include, for example, at least one microprocessor, at least one digital signal processor, at least one microcontroller, or the like. There may be a memory (not shown) that is coupled to the controller 101 that may store command code to be used by the controller 101 or a user data.

The buffer 102 may be configured to receive data and commands from an application 106 executing in a host system 105, and send data and status information to the host system 105. Although only one application 106 has been depicted as executing in the host system 105, it will be understood that any number of applications 106 may be executing in the host system 105. Additionally, it will also be understood that more than one host system 105 may be communicatively coupled to the object storage device 100.

The persistent memory 103 may be non-volatile memory that is accessible in a random access, byte-addressable manner. In one example embodiment, the persistent memory 103 may be, for example, dynamic random access memory (DRAM) or static random access memory (SRAM) having a power supply provided with battery backup. In another example embodiment, the persistent memory 103 may be a nonvolatile (NV) dual inline memory module (DIMM). In still another embodiment, the persistent memory 103 may be a storage class memory (SCM). The persistent memory 103 provides persistent storage, for example, across a power-failure.

The storage media 104 may be a non-volatile mass-storage device, such as, but not limited to one or more solid-state drives (SSDs) and/or one or more hard drives (HDs). In one embodiment, the persistent memory 103 may be used by the controller 101 to store command code and/or user data that is used by the controller 101. The storage media 104 may have a native block size. In one embodiment, the native block size of the storage media may be 512 bytes.

In one embodiment, when the application 106 writes object data to the object storage system 100, the controller 101 allocates a segment, or buffer, of the persistent memory 103 to the application 106. In one embodiment, there may be a plurality of segments in the persistent memory 103 in which each segment has a uniform size with each other segment. The uniform size of the segments may be any convenient size that allows metadata associated with each segment to be no larger than a single cache line for the controller 101 and/or operating system of the controller 101. Two bits of metadata may be associated with each segment and are also stored in the persistent memory 103.

Figure 2:
FIG. 2 depicts an example segment and the metadata that is associated with the segment according to the subject matter disclosed herein.

FIG. 2 depicts an example segment 201 and the metadata 202 that is associated with the segment 201 according to the subject matter disclosed herein. The metadata 202 is also stored in the persistent memory 103 and its size is guaranteed to be within a single cache line, which guarantees that the metadata are persisted once it has been written to the persistent memory 103.

Figure 3:
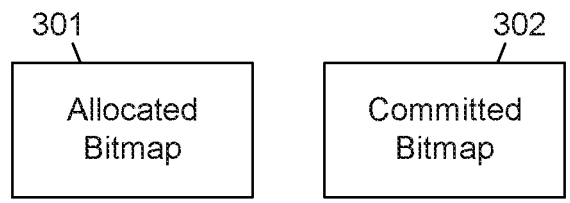
FIG. 3 depicts two example bitmap sections in which the bits in each respective bitmap may represent one of two possible states of a persistent memory segment.

The metadata 202 may be further partitioned into two bitmap sections, or regions. FIG. 3 depicts two example bitmap sections 301 and 302 in which the bits in each respective bitmap may represent one of two possible states of a persistent memory segment. The association between bits in the respective bitmaps and a segment may be defined by a relative position in the bitmap. A first state, an allocated state, indicated by a set bit in the allocated bitmap section 301 means that a corresponding segment is ready for use by an application, that is, the segment has been allocated to the application for use by the application. A second state, a committed state, indicated by a set bit in the committed bitmap 302 means that application data has been written into the segment and is guaranteed to be consistent.

Figure 4:
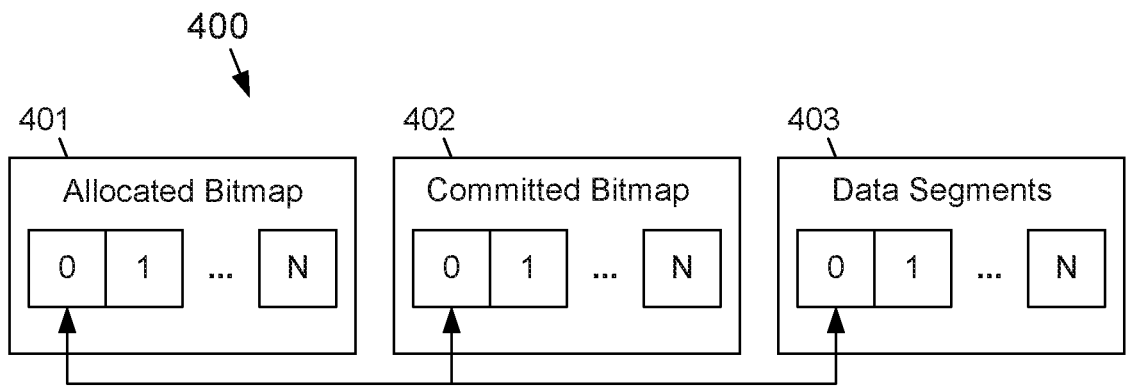
FIG. 4 depicts an example association between bits in an allocated bitmap, a committed bitmap and a data segment that may be defined by the relative positions of the associated bit in the bitmaps according to the subject matter disclosed herein.

That is, one bitmap (i.e., the allocated bitmap 301) may be used to indicate whether a particular data segment has been allocated to an application, and the other bitmap (i.e., the committed bitmap 302) may be used to indicate whether the data-segment is a committed entry. FIG. 4 depicts an example association 400 between bits in an allocated bitmap 401, a committed bitmap 402 and a data segment 403 that may be defined by the relative positions of the associated bit in the bitmaps. It should be noted that although it appears in FIG. 4 that the allocated bitmap 401 and the committed bitmap 402 are the same size as the data segments 403, such is not generally the case because each respective bit map only contains one bit for each data segment, whereas each segment has a uniform size with each other segment and the uniform size of the segments may be any convenient size that allows metadata associated with each segment (i.e., the allocated bitmap 401 and the committed bitmap 402) to be no larger than a single cache line for the controller 101 and/or operating system of the controller 101.

Figure 5:
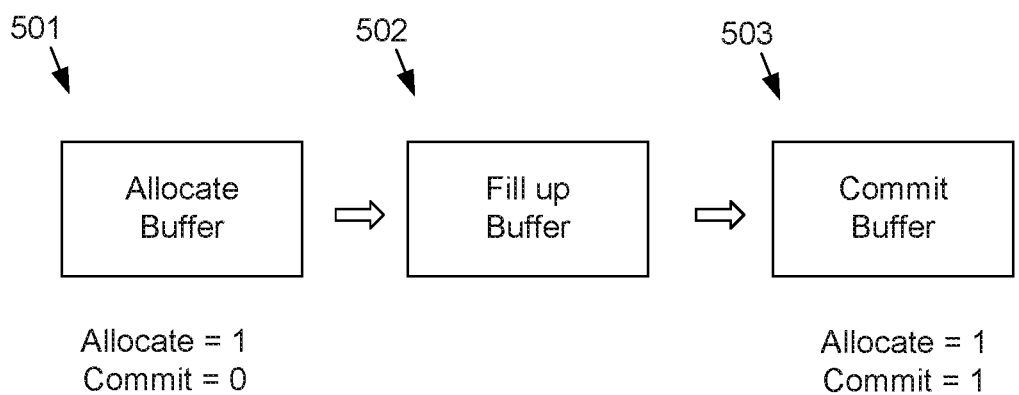
FIG. 5 pictorially depicts a bit of an allocated bitmap being set when a data segment has been allocated to an application according to the subject matter disclosed herein.

When a data segment is allocated, then the associated allocated bit may be set by, for example, the controller 101. FIG. 5 pictorially depicts a bit of an allocated bitmap being set at 501 when a data segment has been allocated to an application according to the subject matter disclosed herein. Subsequently at 502, the applicantion writes data to the allocated data segment. When the contents of the data segment are finalized at 503, then the data segment may be committed and the associated committed bit may be set by, for example, the controller 101 in response to an indication from the application that the data segment is finalized. The sequence from 501 to 503 may represent an example of a life-cycle of a data buffer. If a power failure occurs, the two bits associated with a segment may be checked afterwards, and if both bits are set then the data segment may be recovered after the power failure. If only one bit is set, then the data segment is marked as free by, for example, the controller 101. This guarantees that finalized data segments are fully recoverable and also helps the system to avoid any resource leaks after a power failure by freeing up the data segments that were not committed and thereby allowing that data segment to be reused by other applications.

During a recovery from a power failure, the bitmap sections may be traversed in sequence. If both the allocated and committed bits are set, then the corresponding data segment is recoverable. If only one bit is set, then the corresponding data segment and header are considered to be free, and the corresponding allocated and committed bits are then reset to zero by, for example, the controller 101.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions recited in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. An object storage system, comprising:
   a storage medium;
   persistent memory comprising non-volatile memory that is accessible in a random access, byte-addressable manner, the persistent memory being different from the storage medium; and
   a controller coupled to the storage medium and the persistent memory, the controller being configured to:
   receive data from an application for storage in a segment of the persistent memory allocated to the application, the segment of the persistent memory associated with a first bit and a second bit of a bitmap, the first bit being different from the second bit, and the first bit indicating that the segment of the persistent memory is allocated to the application;
   set the second bit of the bitmap to indicate that data in the segment of the persistent memory is ready for storage in the storage medium; and
   determine that the data in the persistent memory has atomicity based on the first bit and the second bit.

2. The object storage system of claim 1, wherein the controller is further configured to allocate the segment of the persistent memory to the application in response to a request received from the application.

3. The object storage system of claim 2, wherein the controller is further configured to store the data in the segment of the persistent memory in the storage medium based on the second bit of the bitmap being set.

4. The object storage system of claim 3, wherein the persistent memory further comprises a plurality of segments each having a same size as another segment of the plurality of segments, and
   wherein each segment is associated with a corresponding first bit and a corresponding second bit of the bitmap.

5. The object storage system of claim 4, wherein the bitmap comprises a first bitmap region and a second bitmap region, and
   wherein the first bit associated with each of the plurality of segments are located in the first bitmap region and the second bit associated with each of the plurality of segments are located in the second bitmap region.

6. The object storage system of claim 1, wherein the persistent memory further comprises random access memory having a power supply with battery backup, a non-volatile dual inline memory (NVDIMM) or a storage class memory (SCM).

7. The object storage system of claim 1, wherein the storage medium comprises a solid-state drive (SSD) or a hard drive (HD).

8. An object storage system, comprising:
   a storage medium;
   persistent memory comprising non-volatile memory that is accessible in a random access, byte-addressable manner, the persistent memory being different from the storage medium; and
   a controller coupled to the storage medium and the persistent memory, the controller being configured to:
   allocate a segment of the persistent memory to an application, the segment of the persistent memory being associated with a first bit and a second bit of a bitmap, the first bit being different from the second bit;
   set the first bit of the bitmap to indicate that the segment of the persistent memory is allocated;
   receive data from the application for storage in the segment of the persistent memory;
   set the second bit of the bitmap to indicate that data in the segment of the persistent memory is ready for storage in the storage medium; and
   determine that the data in the persistent memory has atomicity based on the first bit and the second bit.

9. The object storage system of claim 8, wherein the controller is further configured to store the data in the segment of the persistent memory in the storage medium based on the second bit of the bitmap being set.

10. The object storage system of claim 8, wherein the persistent memory further comprises a plurality of segments each having a same size as another segment of the plurality of segments, and
    wherein each segment is associated with a corresponding first bit and a corresponding second bit of the bitmap.

11. The object storage system of claim 10, wherein the bitmap comprises a first bitmap region and a second bitmap region, and
    wherein the first bit associated with each of the plurality of segments are located in the first bitmap region and the second bit associated with each of the plurality of segments are located in the second bitmap region.

12. The object storage system of claim 8, wherein the persistent memory further comprises random access memory having a power supply with battery backup.

13. The object storage system of claim 8, wherein the persistent memory comprises a non-volatile dual inline memory (NVDIMM) or a storage class memory (SCM).

14. The object storage system of claim 8, wherein the storage medium comprises a solid-state drive (SSD) or a hard drive (HD).

15. A method to provide atomicity for data writes to an object storage system, the method comprising:
- allocating a segment of a persistent memory to an application, the persistent memory comprising non-volatile memory that is accessible in a random access, byte-addressable manner, and the segment of the persistent memory being associated with a first bit and a second bit of a bitmap, the first bit being different from the second bit;
- setting the first bit of the bitmap to indicate that the segment of the persistent memory is allocated;
- receiving data from the application for storage in the segment of the persistent memory;
- setting the second bit of the bitmap to indicate that data in the segment of the persistent memory is ready for storage in a storage medium that is different from the persistent memory; and
- determining that the data in the persistent memory has atomicity based on the first bit and the second bit.

16. The method of claim 15, further comprising storing the data in the segment of the persistent memory in the storage medium based on the second bit of the bitmap being set.

17. The method of claim 15, wherein the persistent memory further comprises a plurality of segments each having a same size as another segment of the plurality of segments, and
- wherein each segment is associated with a corresponding first bit and a corresponding second bit of the bitmap.

18. The method of claim 17, wherein the bitmap comprises a first bitmap region and a second bitmap region, and
- wherein the first bit associated with each of the plurality of segments are located in the first bitmap region and the second bit associated with each of the plurality of segments are located in the second bitmap region.

19. The method of claim 15, wherein the persistent memory further comprises random access memory having a power supply with battery backup, a non-volatile dual inline memory (NVDIMM) or a storage class memory (SCM).

20. The method of claim 15, wherein the storage medium comprises a solid-state drive (SSD) or a hard drive (HD).

* * * * *